(12) United States Patent
Koechl et al.

(10) Patent No.: US 10,500,688 B2
(45) Date of Patent: Dec. 10, 2019

(54) MACHINING UNIT FOR A MACHINE TOOL AND MACHINE TOOL WITH SUCH A MACHINING UNIT

(71) Applicant: DECKEL MAHO Pfronten GmbH, Pfronten (DE)

(72) Inventors: Roland Koechl, Vils (AT); Martin Rinderle, Kempten (DE)

(73) Assignee: DECKEL MAHO Pfronten GmbH, Pfronten (DE)

( * ) Notice: Subject to any disclaimer, the term of this patent is extended or adjusted under 35 U.S.C. 154(b) by 388 days.

(21) Appl. No.: 15/528,334

(22) PCT Filed: Nov. 18, 2015

(86) PCT No.: PCT/EP2015/076978
§ 371 (c)(1),
(2) Date: May 19, 2017

(87) PCT Pub. No.: WO2016/079188
PCT Pub. Date: May 26, 2016

(65) Prior Publication Data
US 2017/0320180 A1 Nov. 9, 2017

(30) Foreign Application Priority Data

Nov. 20, 2014 (DE) .......................... 10 2014 223 757

(51) Int. Cl.
*B23Q 1/54* (2006.01)
*B23Q 5/14* (2006.01)
(Continued)

(52) U.S. Cl.
CPC ................ *B23Q 5/142* (2013.01); *B23C 1/12* (2013.01); *B23Q 1/54* (2013.01); *B23Q 5/14* (2013.01);
(Continued)

(58) Field of Classification Search
CPC . B23Q 1/12; B23Q 1/017; B23Q 1/28; B23Q 1/54; B23Q 1/5468; B23Q 1/25;
(Continued)

(56) References Cited

U.S. PATENT DOCUMENTS 1,976,107 A 10/1934 Archea
4,332,147 A * 6/1982 Grech .................. B23B 45/003
173/216
(Continued)

FOREIGN PATENT DOCUMENTS

DE 44 02 084 A1 8/1995
DE 102 51 257 A1 5/2004
(Continued)

OTHER PUBLICATIONS

Office Action for DE 10 2014 223 757.2 with partial English Translation, dated Sep. 4, 2015, 9 pages.
(Continued)

*Primary Examiner* — Scott A Smith
(74) *Attorney, Agent, or Firm* — Seed IP Law Group LLP

(57) ABSTRACT

A machining unit for a machine tool and machine tool having such a machining unit comprises a head carrier that is attached to the machine tool, a pivot head held on the head carrier in such a way that the pivot head can be pivoted about a pivot axis, a working spindle, which is arranged on the pivot head and has a spindle axis that is tilted in relation to the pivot axis, a spindle motor, which is arranged in the head carrier and has a drive shaft arranged parallel to the pivot axis, and a drive transmission for transmitting the rotational motion of the drive shaft of the spindle motor to the working spindle, wherein the drive transmission has a transmission stage that can be shifted. The pivot head has a shifting transmission shaft that is oriented coaxially to the pivot axis of the pivot head, wherein the transmission stage that can be (Continued)

shifted has a hollow shaft movably supported on the shifting transmission shaft of the pivot head.

25 Claims, 11 Drawing Sheets

(51) Int. Cl.
   *B23C 1/12* (2006.01)
   *F16H 3/32* (2006.01)
   *B23C 9/00* (2006.01)
   *B23Q 5/04* (2006.01)

(52) U.S. Cl.
   CPC ............. *F16H 3/32* (2013.01); *B23C 9/005* (2013.01); *B23Q 5/045* (2013.01)

(58) Field of Classification Search
   CPC ...... B23Q 5/045; B23Q 11/12; B23Q 16/028; B23Q 39/02; B23C 1/12; B23C 1/10; B23C 9/005; B23B 31/263
   USPC .... 173/29, 216, 213, 47; 409/201, 211, 215, 409/216, 230, 231, 232, 88, 89; 408/236; 74/417, 411, 411.5, 469; 29/26 A, 39, 29/48.5 A, 40, 27 R
   See application file for complete search history.

(56) References Cited

U.S. PATENT DOCUMENTS

| | | | | |
|---|---|---|---|---|
| 4,378,621 A * | 4/1983 | Babel | ............... | B23C 1/12 29/26 A |
| 4,559,682 A * | 12/1985 | Sachot | ............... | B23B 31/4026 29/26 A |
| 4,610,584 A * | 9/1986 | Malzkorn | ............... | B23Q 1/54 408/236 |
| 4,635,329 A * | 1/1987 | Holy | ............... | B23Q 1/52 29/27 C |
| 4,657,453 A * | 4/1987 | Goulot | ............... | B23Q 1/5412 409/211 |
| 4,715,102 A * | 12/1987 | Wolf | ............... | B23Q 1/54 29/27 R |
| 4,787,785 A * | 11/1988 | Hiller | ............... | B23B 31/261 409/136 |
| 4,841,795 A * | 6/1989 | Obrietan | ............... | B23Q 1/54 74/417 |
| 5,002,443 A * | 3/1991 | Yang | ............... | B23Q 1/54 409/201 |
| 5,127,779 A * | 7/1992 | Yang | ............... | B23Q 1/54 409/201 |
| 5,413,439 A * | 5/1995 | Wu | ............... | B23Q 1/54 409/211 |
| 5,533,846 A | 7/1996 | Geissler | | |
| 5,632,075 A * | 5/1997 | De Bernardi | ............... | B23Q 5/045 29/40 |
| 5,813,283 A * | 9/1998 | Chen | ............... | B23Q 1/54 409/201 |
| 5,947,210 A * | 9/1999 | Sasaki | ............... | B25B 23/141 173/178 |
| 6,669,416 B2 * | 12/2003 | Klement | ............... | B23Q 1/287 310/156.25 |
| 6,944,923 B2 | 9/2005 | Geissler et al. | | |
| 6,951,440 B2 * | 10/2005 | Piccolo | ............... | B23Q 1/54 409/216 |
| 8,523,500 B2 * | 9/2013 | Yamaura | ............... | B23Q 1/623 29/33 P |
| 8,555,999 B2 * | 10/2013 | McRoberts | ............... | B25F 5/02 173/170 |
| 2011/0203821 A1 * | 8/2011 | Puzio | ............... | B25B 23/0064 173/1 |

FOREIGN PATENT DOCUMENTS

| | | |
|---|---|---|
| EP | 0 664 176 A1 | 7/1995 |
| EP | 1 415 758 A1 | 5/2004 |
| FR | 929135 A | 12/1947 |
| WO | 2006/032936 A1 | 3/2006 |

OTHER PUBLICATIONS

International Search Report for Application No. PCT/EP2015/076978, dated Feb. 12, 2016, 4 pages.

* cited by examiner

MACHINING UNIT FOR A MACHINE TOOL AND MACHINE TOOL WITH SUCH A MACHINING UNIT

BACKGROUND

Technical Field

The present disclosure relates to a machining unit for a machine tool and a machine tool having such a machining unit.

Description of the Related Art

Type-specific machining units known from the state of the art mostly comprise at least one head carrier which can be attached to the machine tool, a pivot head held on the head carrier in such a way that the pivot head can be pivoted about a pivot axis, a working spindle which is arranged on the pivot head and has a spindle axis that is tilted in relation to the pivot axis, a spindle motor which is arranged in the head carrier and has a drive shaft arranged coaxially to the pivot axis, and a drive transmission for transmitting the rotational motion of the drive shaft of the spindle motor to the working spindle, wherein the drive transmission has a transmission stage that can be shifted.

Here, it may for example be referred to the type-specific machining units known from DE 44 02 084 A1 or DE 102 51 257 A1.

DE 44 02 084 A1 describes a machine tool, in particular a universal milling and drilling machine, comprising a pivot milling head for automatically retooling from horizontal to vertical machining. The drive of the working spindle is provided by a drive motor through a drive transmission with a bevel gear stage and a shifting transmission which is arranged on the working spindle in the pivot milling head, wherein the bevel gear transmission of the bevel gear stage is located directly on the drive shaft of the drive motor of the spindle.

For developing the machine tool (universal milling and drilling machine) according to DE 44 02 084 A1, in DE 102 51 257 A1 a machining unit for a program-controlled machine tool was proposed, which has a head carrier that is movable in several coordinate axes and has a rotational axis pointing forwardly downwards by 45 degrees, a pivot head which is front-supported on the head carrier in such a way that it can be rotated about the rotational axis of 45 degrees by a motor, a spindle head which is fixedly mounted on the pivot head and has a working spindle whose axis extends at an angle of 45 degrees to the rotational axis of 45 degrees, a spindle motor which is oriented coaxially to the rotational axis of 45 degrees, and an angular transmission, which is arranged in the pivot head, for the spindle drive. The pivot head comprises a hollow-cylindrical housing part coaxial to the rotational axis of 45 degrees, in which the spindle motor is fastened, and the head carrier has a housing base in which the housing part of the pivot head is rotatably supported.

BRIEF SUMMARY

The present disclosure provides a machining unit for a machine tool or rather a machine tool with such a machining unit or rather develop the known machining units for a machine tool such that an optimal flow of forces and an optimal torque transmission through a shiftable transmission to the working spindle is ensured with high stiffness, low space requirement and low constructive effort and at the same time the structural components of the machining unit for maintenance and service are arranged in an easily accessible manner and a flexible and reliable supply line to the pivot head or rather to the spindle is allowed.

According to an aspect of the present disclosure, a machining unit for a machine tool is suggested, which comprises a head carrier attachable to the machine tool, a pivot head held on the head carrier in such a way that the pivot head can be pivoted about a pivot axis, a working spindle that is arranged on the pivot head and has a spindle axis that is tilted in relation to the pivot axis, a spindle motor that is arranged in the head carrier and has a drive shaft arranged parallel to the pivot axis, and/or a drive transmission for transmitting the rotational motion of the drive shaft of the spindle motor to a drive shaft of the working spindle, wherein the drive transmission has a shiftable transmission stage, in particular to provide different gear ratios in the spindle drive according to two or more drive gears.

In particular, the machining unit according to the present disclosure is characterized in that the pivot head has a shifting transmission shaft oriented coaxially to the pivot axis of the pivot head, wherein the shiftable transmission stage has a hollow shaft movably supported on the shifting transmission shaft of the pivot head.

Here, this results in an especially efficient, space-saving, stiff arrangement designable for different torques with optimal torque transmission, with which the drive shaft of the spindle motor is not oriented coaxially to the pivot axis of the pivot head, but a shifting transmission shaft of the drive transmission in the pivot head is oriented coaxially to the pivot axis of the pivot head on which a hollow shaft of the shiftable transmission stage, shiftable or rather movable on the shifting transmission shaft, is supported for providing a shifting option of the drive transmission.

Advantageously, this enables not only to provide a precise and compact configured shifting option of the drive transmission of the spindle drive with different gear ratios, but additionally enables advantageously to arrange the spindle motor inside the head carrier offset to the pivot axis, whereby within the head carrier, arrangements of the structural components are enabled with which both the drive motor of the rotatably controlled pivot axis and the spindle motor as well as the transmission parts of the drive of the rotatably controlled pivot axis can be arranged within the head carrier easily accessible for maintenance and service.

In an efficient and space-saving manner, it is furthermore possible now to arrange supply lines or rather supply pipes (e.g., for energy supplies or rather further hydraulic and/or pneumatic supplies as well as coolant supplies) to the pivot head, which previously had to be arranged at the outside, i.e., outside the head carrier housing in a manner susceptible to damage and wear, e.g., in the machining unit of DE 102 51 257 A1, optimally within the head carrier housing, whereby the supply lines can be better protected against damages and wear.

In particular, due to this enabled offset of the spindle motor in relation to the pivot axis, the support lines inside the head carrier housing can be guided to the pivot head closer to the pivot axis such that it is easier to consider the impact of the pivoting capacity to the lines.

According to a preferred embodiment, the shiftable transmission stage is preferably configured to shift the drive transmission between a first drive gear and a second drive gear, in particular at different gear ratios, preferably by shifting the movably supported hollow shaft on the shifting transmission shaft parallel to the pivot axis between a first position and a second position.

Here, the first drive gear is preferably engaged if the movably supported hollow shaft is in the first position, and the second drive gear is preferably engaged if the movably supported hollow shaft is in the second position. In further embodiments, it is possible to introduce further intermediate positions such that three or more gears are available.

In an especially preferred and appropriate embodiment, the shifting transmission shaft has a first axis section, a second axis section, and a piston section arranged between the first axis section and the second axis section, wherein the piston section preferably has a diameter greater than the first axis section and the second axis section. Preferably, the shiftable transmission stage furthermore has a cylinder jacket that is arranged in the hollow shaft and in which the piston section is preferably movably sealingly supported.

With such an arrangement, a compact and reliable pneumatic and/or hydraulic shifting control can be enabled with which the pneumatically or rather hydraulically movable piston or rather piston section in a cylinder jacket can be integrated in a compact, reliable and simple manner inside the shiftable unit with a hollow shaft and a shifting transmission shaft and no additional space-consuming pneumatic and/or hydraulic cylinders are required.

Herewith, "movably sealingly" is in particular to be understood such that the cylinder jacket and the piston section are movable relative to each other, but such that a pneumatic and/or hydraulic sealing is still present between the piston section and the cylinder jacket or rather is maintained during the moving. This embodiment particularly has the advantage that the moving of the cylinder jacket in relation to the piston section for shifting the shifting transmission stage can take place pneumatically or rather hydraulically in a simple manner by generating pressure differences at the two sides of the piston section pneumatically and/or hydraulically.

Particularly, for a further optimized sealing and also for supporting or rather bearing the hollow shaft by means of a simple and compact configuration, a further preferred configuration is suggested in which a first sealing head is preferably fastened at a first end of the cylinder jacket and is preferably movably sealingly supported on the first axis section of the shifting transmission shaft, and/or preferably a second sealing head is fastened at a second end of the cylinder jacket and is preferably movably sealingly supported on the second axis section of the shifting transmission shaft. Here, the hollow shaft can preferably be supported rotatably on the first sealing head and/or on the second sealing head.

According to a further preferred embodiment, the first axis section preferably comprises an axially extending first channel and the second axis section preferably comprises an axially extending second channel, wherein first channel openings of the first axis section preferably connect the first channel with a clearance between the cylinder jacket, the piston section, the first axis section and/or the first sealing head, and/or second channel openings of the second axis section preferably connect the second channel with a clearance between the cylinder jacket, the piston section, the second axis section and/or the second sealing head. Preferably, here the shiftable transmission stage is particularly configured to be shifted by hydraulically and/or pneumatically generated pressure differences between the first and the second channel or rather thereby generated pressure differences between the two clearances.

In a further appropriate and preferred embodiment, the drive transmission preferably has a sliding gearset transmission stage with a sliding gearset comprising two cylindrical gears, wherein a first cylindrical gear of the sliding gearset is preferably non-rotatably arranged on the drive shaft of the spindle motor and a second cylindrical gear of the sliding gearset engaging the first cylindrical gear is preferably non-rotatably arranged on the movably supported hollow shaft.

In a further appropriate and preferred embodiment, the shiftable transmission stage preferably comprises a first cylindrical gear pair for a first transmission gear and/or a second cylindrical gear pair for a second transmission gear, in particular with different gear ratios. The first cylindrical gear pair preferably comprise a third cylindrical gear which is preferably non-rotatably arranged on the movably supported hollow shaft, and/or the second cylindrical gear pair preferably comprise a fourth cylindrical gear which is preferably non-rotatably arranged on the movably supported hollow shaft. Alternatively, for example the first cylindrical gear pair can comprise the second cylindrical gear, and the second cylindrical gear pair can comprise a fourth cylindrical gear which is non-rotatably arranged on the movably supported hollow shaft.

In another appropriate and preferred embodiment, the cylindrical gears of the first cylindrical gear pair preferably mesh then when the movably supported hollow shaft is in the first position, and the cylindrical gears of the second cylindrical gear pair preferably mesh then when the movably supported hollow shaft is in the second position.

In a further appropriate and preferred embodiment, the pivot head preferably comprises an intermediate shaft which is preferably oriented parallel to the pivot axis of the pivot head. Preferably, the drive transmission comprises a bevel gear transmission stage, wherein a first bevel gear of the bevel gear transmission stage is preferably non-rotatably arranged on the intermediate shaft. Preferably, a second bevel gear of the bevel gear transmission stage for driving the working spindle is preferably non-rotatably arranged on the drive shaft of the working spindle. Preferably, the first cylindrical gear pair comprise a fifth cylindrical gear which is preferably non-rotatably arranged on the intermediate shaft, and/or the second cylindrical gear pair preferably comprise a sixth cylindrical gear which is preferably non-rotatably arranged on the intermediate shaft.

In a further appropriate and preferred embodiment, the pivot head has a pivot axis gear which is preferably arranged coaxially to the pivot axis, and the machining unit preferably comprises a rotational axis motor arranged on the head carrier and/or one or more transmission units preferably engaging the pivot axis gear for transmitting the rotational motion of a drive shaft of the rotational axis motor to the pivot axis gear, wherein the one or more transmission units are preferably driven by a common toothed belt which is preferably engaged with a gear on the drive shaft of the rotational axis motor.

Preferably, the machining unit in particular comprises two transmission units engaging with the pivot axis gear for transmitting the rotational motion of the drive shaft of the rotational axis motor to the pivot axis gear, wherein the two transmission units are preferably driven by the common toothed belt, wherein each of the two transmission units preferably has a respective main axis preferably arranged parallel to the drive shaft of the rotational axis motor, wherein the two main axes and the drive shaft of the rotational axis motor are preferably arranged substantially equally spaced to each other, preferably such that the toothed belt substantially takes a form corresponding to an equilateral triangle.

Preferably, the rotational axis motor is arranged on the side of the one or more transmission units opposite to the pivot axis, and/or the rotational axis motor and the spindle motor are preferably arranged relative to each other at opposite sides of the pivot axis.

The drive shaft of the rotational axis motor is preferably arranged parallel to the pivot axis, and the drive shaft of the rotational axis motor and the drive shaft of the spindle motor preferably span a common plane preferably with the pivot axis, and the pivot axis is preferably arranged between the two drive shafts.

Preferably, the head carrier comprises a head carrier housing and a supply pipe or rather supply line preferably extending to the pivot head within the head carrier housing. Here, the supply pipe or rather the supply line is preferably arranged between the spindle motor and the rotational axis motor.

According to a further implementation of the disclosure, a machine tool with a machining unit according to one of the preceding configurations is suggested, wherein the machining unit is preferably attached to the machine tool movably in at least one coordinate axis or rather even two or three coordinate axes.

DETAILED DESCRIPTION

In the following, embodiments of the present disclosure are described in detail by means of the exemplary figures. The features of the embodiments are totally or partially combinable, and the present disclosure is not at all limited to the described embodiments. In the figures, same or rather similar features are indicated by the same references.

Figure 1:
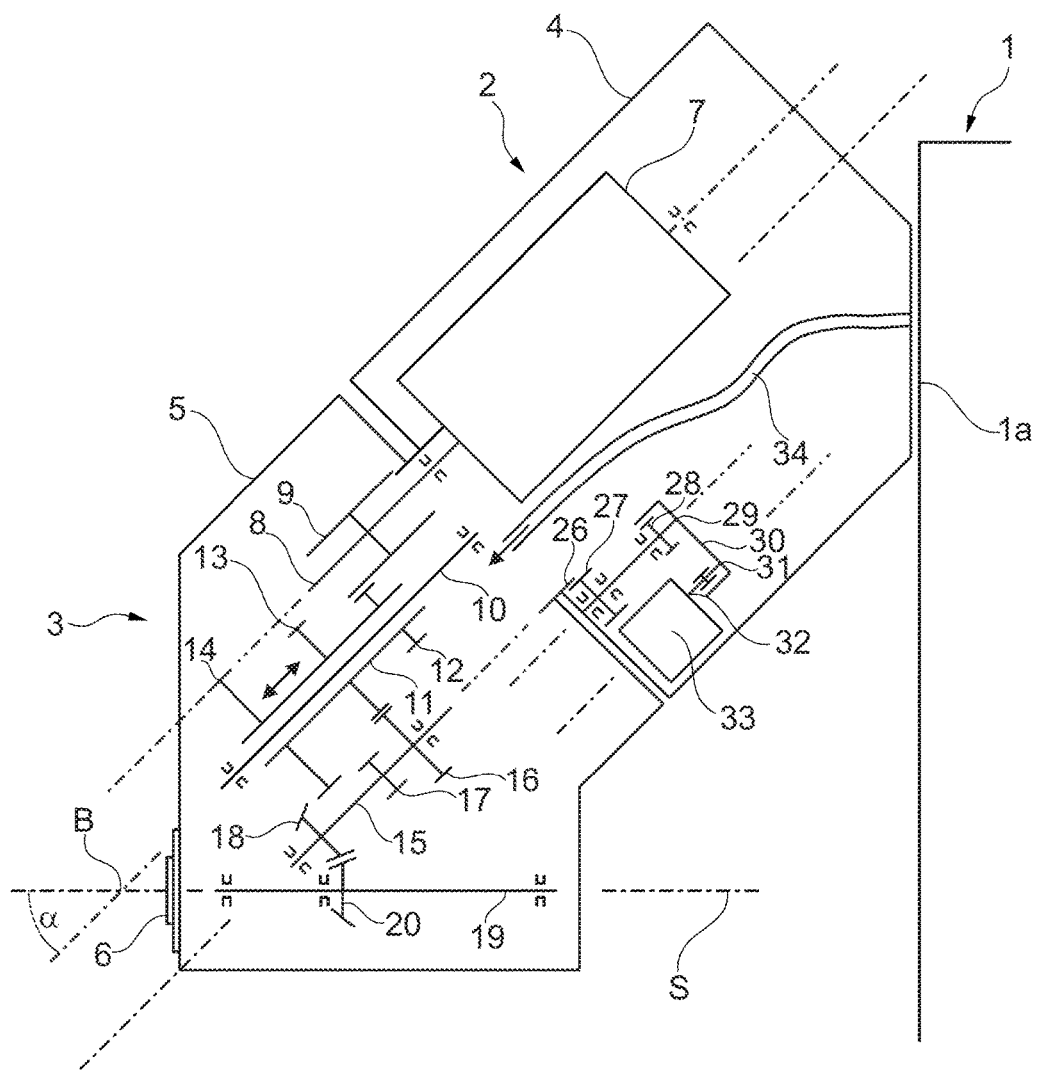
FIG. 1 exemplarily shows a schematic view of a spindle drive of a machining unit according to an embodiment of the disclosure, FIG. 2 exemplarily shows a perspective view of a spindle drive of a machining unit according to an embodiment of the disclosure, FIG. 3A exemplarily shows a perspective view of the spindle drive according to FIG. 2 in a first drive gear with the working spindle in horizontal position, FIG. 3B exemplarily shows a perspective view of the spindle drive according to FIG. 2 in a second drive gear with the working spindle in a horizontal position, FIG. 4A exemplarily shows a perspective view of the spindle drive according to FIG. 2 with the working spindle in vertical position, FIG. 4B exemplarily shows a perspective view of the spindle drive according to FIG. 2 with the working spindle in a horizontal position, FIG. 5A exemplarily shows a cross-sectional view of a shiftable transmission stage according to an embodiment of the disclosure in a first drive gear, FIG. 5B exemplarily shows a cross-sectional view of a shiftable transmission stage according to an embodiment of the disclosure in a second drive gear, FIG. 6 exemplarily shows a cross-sectional view of a detail of the shiftable transmission stage of FIGS. 5A and 5B, FIG. 7A exemplarily shows a perspective view of an arrangement of the drive motors of a head carrier according to an embodiment of the disclosure, FIG. 7B exemplarily shows a perspective view of a rotational axis drive of a head carrier according to an embodiment of the disclosure, FIG. 7C exemplarily shows a side view of the rotational axis drive according to FIG. 7B, FIG. 8A exemplarily shows a cross-sectional view of a shiftable transmission stage according to a further embodiment of the disclosure in a first drive gear, and FIG. 8B exemplarily shows a cross-sectional view of a shiftable transmission stage according to the further embodiment of the disclosure in a second drive gear.

FIG. 1 exemplarily shows a schematic view of a spindle drive of a machining unit according to an embodiment of the disclosure.

The machining unit comprises a head carrier 2 that is attached to the machine tool 1, in particular at the front 1a of a machine base of the machine tool 1 and has a head carrier housing 4, a pivot head 3 that has a pivot head housing 5 and is held on the head carrier 2 in such a way that it can be pivoted about a pivot axis B, and a working spindle 6 that is arranged on the pivot head 3 and has a spindle axis S tilted in relation to the pivot axis B, in particular for example tilted by 45 degrees (angle α).

The pivot axis B itself is tilted forwardly downwards by for example 45 degrees in relation to a vertical line or rather in relation to the front 1a of the machine base of the machine tool 1. Due to the inclination of the spindle axis S to the pivot axis B, the spindle axis S of the spindle 6 can be horizontally oriented as depicted in FIG. 1. Furthermore, the spindle axis S can be pivoted about the pivot axis B by pivoting the pivot head 3, and the spindle 6 with its spindle axis S can be vertically oriented for a vertical machining by pivoting the pivot head 3 about the pivot axis B by 180 degrees.

Inside the head carrier housing 4, the head carrier 2 comprises a spindle motor 7 (or rather spindle drive) which is arranged in the head carrier 2 and has a drive shaft 8 which is arranged parallel to the pivot axis B and is for example overhung (i.e., in this embodiment the drive shaft 8 is for example not supported at the pivot head side, but for example only at the head carrier side) and which protrudes from the head carrier 4 into the pivot head 3. The rotational axis of the drive shaft 8 of the spindle motor 7 is arranged parallel, however for example not coaxially, but offset relative to the pivot axis B.

The working spindle 6 furthermore comprises a drive shaft 19 which is rotatably supported in the pivot head 3 and is oriented for example coaxially to the spindle axis S, but can also be oriented offset parallel to the spindle axis S in further embodiments of the disclosure.

Furthermore, the interior of the pivot head housing 5 accommodates a drive transmission for transmitting the rotational motion of the drive shaft 8 of the spindle motor 7 to the drive shaft 19 of the working spindle 6.

The drive transmission comprises a shifting transmission shaft 10 which is oriented coaxially to the pivot axis B of the pivot head 3 and on which a hollow shaft 11 of a shiftable transmission stage for shifting the drive transmission is supported in a manner axially shiftable as well as rotatable about the shifting transmission shaft 10.

At the end of the drive shaft 8 projecting into the pivot head 3, an elongated cylindrical gear 9 is non-rotatably and fixedly arranged for forming a sliding seat for the cylindrical gear 12, which is non-rotatably and fixedly arranged on the hollow shaft 11 of the drive transmission.

The three cylindrical gears 12, 13 and 14 are non-rotatably and fixedly arranged on the hollow shaft 11, wherein the cylindrical gear 12 intermeshes the cylindrical gear 9 which is non-rotatably and fixedly arranged on the drive shaft 8 of the spindle motor 7.

The cylindrical gear pair of the cylindrical gears 9 and 12 here form a sliding gearset transmission stage with sliding seat, wherein the cylindrical gear 12 arranged on the hollow shaft 11 remains in engagement with the cylindrical gear 9 non-rotatably and fixedly arranged on the drive shaft 8 of the spindle motor 7, if the hollow shaft 11 in FIG. 1 is axially shifted towards the shifting transmission shaft 10 (in particular for example in FIG. 1 to top right).

Furthermore, the drive transmission in the pivot head 3 comprises a rotatably supported intermediate shaft 15 that is oriented parallel to the pivot axis B of the pivot head, however not coaxially, but parallel offset. On the intermediate shaft 15 the cylindrical gears 16 and 17 as well as the bevel gear 18 are non-rotatably and fixedly arranged.

The bevel gear 18 of the intermediate shaft 15 meshes a bevel gear 20 which is non-rotatably and fixedly arranged on the drive shaft 19 of the spindle 6, wherein the bevel gears 18 and 20 form an angular transmission stage transmitting the drive rotation with an angle of 45 degrees and thus balancing the angle $\alpha=45$ degrees between the spindle axis S and the rotational axis B.

The shiftable transmission stage on the shifting transmission shaft 10 with the axially movably supported hollow shaft is configured to shift the drive transmission of the pivot head 3 between a first drive gear and a second drive gear with different gear ratios by shifting the axially moveably supported hollow shaft 11 on the shifting transmission shaft 10 parallel to the pivot axis B between a first position and a second position.

The first drive gear is engaged or rather shifted if the movably supported hollow shaft 11 is in the first position, and the second drive gear is engaged or rather shifted if the movably supported hollow shaft 11 is in the second position.

Here, FIG. 1 exemplarily shows the hollow shaft 11 in the first position in which the cylindrical gear 13 on the hollow shaft 11 is engaged with the cylindrical gear 16 at the intermediate shaft 15 and the first drive gear is engaged.

In the first drive gear, the driving rotational motion of the driving drive shaft 8 of the spindle motor 7 is transmitted such that a rotation of the cylindrical gear 9 generated due to the rotational motion of the driving drive shaft 8 causes a rotation of the cylindrical gear 12 and thus a rotation of the hollow shaft 11 about the shifting transmission shaft 10 by way of the engagement with the cylindrical gear 12 located on the hollow shaft 11.

In the first position of the hollow haft 11 according to FIG. 1, the cylindrical gear 14 is not engaged with any other gear and rotates freely just as the cylindrical gear 17 and without an engagement with a respective mating gear, and the cylindrical gear 13, which is also rotating with the hollow shaft and engaging with the cylindrical gear 16 located on the intermediate shaft 15 in the first position of the hollow shaft 11 according to FIG. 1, transmits the rotation or rather the torque of the hollow shaft 11 to the intermediate shaft 15.

The rotation or rather the torque of the intermediate shaft 15 is transmitted to the spindle drive shaft 19 through the bevel gear 18 located on the intermediate shaft and the therewith engaged bevel gear 20 located on the spindle drive shaft 19, and drives the spindle 6.

Thus, according to this embodiment, in the first drive gear the torque of the spindle motor 7 is transmitted to the hollow shaft 11 through the drive shaft 8 by means of the sliding gearset transmission stage of the cylindrical gears 9 and 12, to the intermediate shaft 15 through the hollow shaft 11 in the first position by means of the shifting transmission stage of the meshing cylindrical gears 13 and 16 shifted to the first drive gear, and finally to the spindle drive shaft 19 through the intermediate shaft 15 by means of the angular transmission stage of the bevel gears 18 and 20.

In order to shift to the second drive gear, the hollow shaft 11 can axially be shifted on the shifting transmission shaft 10, in particular in the example according to FIG. 1 towards the head carrier 2 such that the engagement of the cylindrical gears 13 and 16 is released and the cylindrical gears 17 and 14 are engaged.

After shifting the hollow shaft 11 to the second position of the second drive gear, the cylindrical gears 13 and 16 are engaged, and the cylindrical gears 13 and 16 rotate freely and without engagement with a respective mating gear. Moreover, the cylindrical gears 9 and 12 of the sliding gearset remain engaged with each other also in the second position of the hollow shaft 11.

In the second drive gear, the driving rotational motion of the driving drive shaft 8 of the spindle motor 7 is transmitted such that the rotation of the cylindrical gear 9 generated due to the rotational motion of the driving drive shaft 8 causes a rotation of the cylindrical gear 12 through the engagement with the cylindrical gear 12 located on the hollow shaft 11 and thus a rotation of the hollow shaft 11 about the shifting transmission shaft 10.

In the second position of the hollow shaft 11, the cylindrical gear 13 is not engaged with any other gear and rotates freely, and the cylindrical gear 14, which is also rotating with the hollow shaft 11 and engaged with the cylindrical gear 17 located on the intermediate shaft 15 in the second position of the hollow shaft 11, transmits the rotation or rather the torque of the hollow shaft 11 to the intermediate shaft 15.

The rotation or rather the torque of the intermediate shaft 15 is transmitted to the spindle drive shaft 19 through the bevel gear 18 located on the intermediate shaft and the therewith engaged bevel gear 20 located on the spindle drive shaft 19, and drives the spindle 6.

Thus, according to this embodiment, in the second drive gear, the torque of the spindle motor 7 is transmitted to the hollow shaft 11 through the drive shaft 8 by way of the sliding gearset transmission stage of the cylindrical gears 9 and 12, to the intermediate shaft 15 through the hollow shaft 11 in the second position by way of the shifting transmission stage of the meshing cylindrical gears 14 and 17 shifted to the second drive gear, and finally to the spindle drive shaft 19 through the intermediate shaft 15 by way of the angular transmission stage of the bevel gears 18 and 20.

Figure 2:
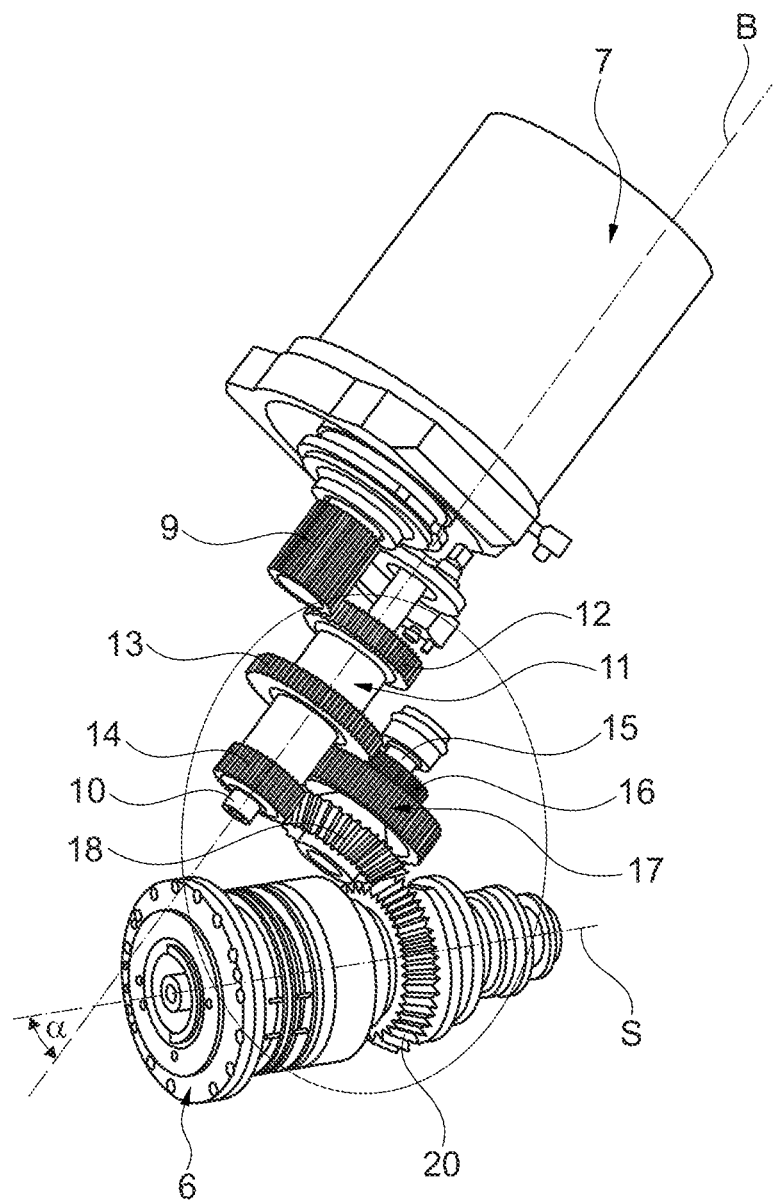

As an example, FIG. 2 shows a perspective view of a spindle drive of a machining unit according to an embodiment of the disclosure. Particularly, FIG. 2 exemplarily shows a constructive configuration of the drive according to FIG. 1. The working spindle 6 is oriented horizontally, wherein the angle between the spindle axis S of the working spindle 6 and the rotational axis B is $\alpha=45$ degrees. FIG. 2 shows the transmission in the position of the first drive gear, in which the hollow shaft 11 axially movably supported on the shifting transmission shaft 10 is in the first position, in which the cylindrical gear 13 located on the hollow shaft 11 is engaged with the cylindrical gear 16 located on the intermediate shaft 15, and the cylindrical gears 14 and 17 each rotate freely.

Analogue to FIG. 1, according to this embodiment of FIG. 2, the torque of the spindle motor 7 is transmitted to the hollow shaft 11 through the drive shaft of the spindle motor 7 by way of the sliding gearset transmission stage of the cylindrical gears 9 and 12, to the intermediate shaft 15 through the hollow shaft 11 in the first position by way of the shifting transmission stage of the meshing cylindrical gears 13 and 16 shifted to the first drive gear, and finally to the spindle drive shaft of the spindle 6 through the intermediate shaft 15 by way of the angular transmission stage of the bevel gears 18 and 20.

Figure 3A:
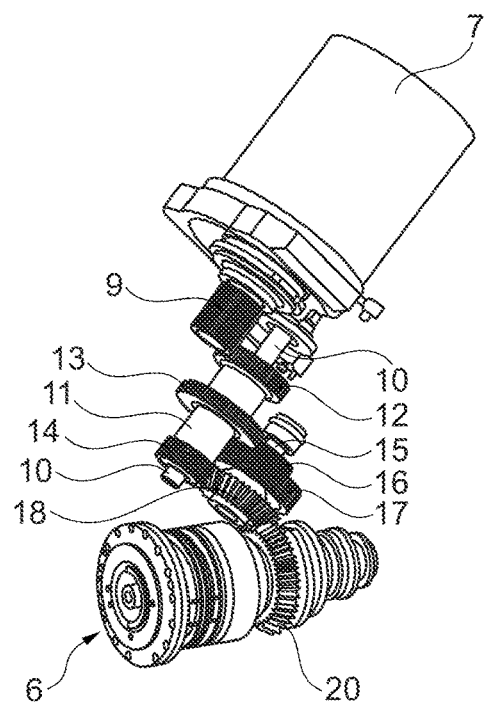
Figure 3B:
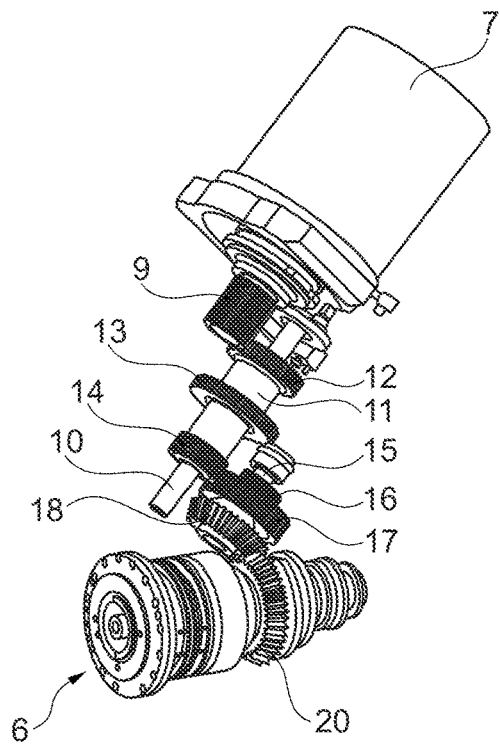

FIG. 3A exemplarily shows a perspective view of the spindle drive according to FIG. 2 in a first drive gear with the working spindle in horizontal position, and FIG. 3B exemplarily shows a perspective view of the spindle drive according to FIG. 2 in a second drive gear with the working spindle in horizontal position. Here, FIG. 3A substantially corresponds to FIG. 2, and FIG. 3A corresponds to a position in which the hollow shaft 11 is moved or shifted axially with respect to the shifting transmission shaft 10 from the first position according to FIG. 2 or rather FIG. 3A to the second position.

In FIG. 3B, the cylindrical gears 13 and 16, which were still engaged in the first position according to FIG. 3A, rotate freely in the second position of the hollow shaft 11, and on the other hand the cylindrical gears 14 and 17 previously freely rotating in FIG. 3A are now engaged with each other in the second position of the hollow shaft according to FIG. 3B.

Here, in the position according to FIG. 3B, according to this embodiment the torque of the spindle motor 7 is transmitted to the hollow shaft 11 through the drive shaft of the spindle motor 7 by way of the sliding gearset transmission stage of the cylindrical gears 9 and 12, to the intermediate shaft 15 through the hollow shaft 11 in the second position by way of the shifting transmission stage of the meshing cylindrical gears 14 and 17 shifted to the second drive gear, and finally to the spindle drive shaft of the spindle 6 through the intermediate shaft 15 by way of the angular transmission stage of the bevel gears 18 and 20.

Figure 4A:
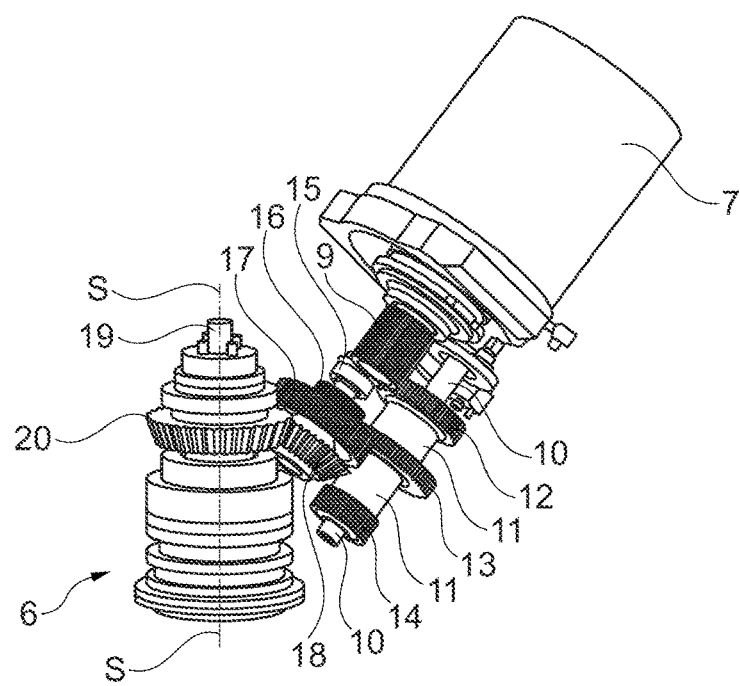
Figure 4B:
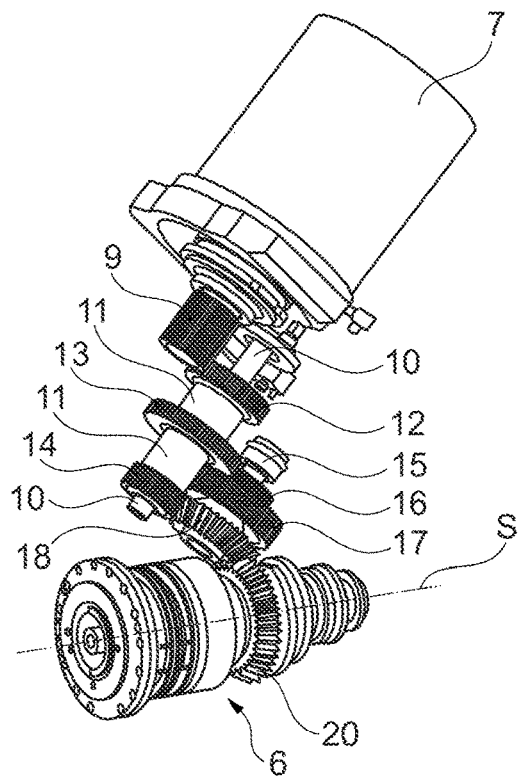

FIG. 4A exemplarily shows a perspective view of the spindle drive according to FIG. 2 with the working spindle in vertical position, and FIG. 4B exemplarily shows a perspective view of the spindle drive according to FIG. 2 with the working spindle in horizontal position. Here, FIG. 4B substantially corresponds to the position of FIGS. 2 and 3A, i.e., for example the drive is shown in the position shifted to the first drive gear.

In FIG. 4A, compared with the position in FIG. 4B, the pivot head 3 is pivoted about the pivot axis B by 180 degrees, such that the spindle axis S of the working spindle 6 is pivoted from the horizontal position to the vertical position. Furthermore, in the position according to FIG. 4A, according to this embodiment the torque of the spindle motor 7 is transmitted to the hollow shaft 11 through the drive shaft of the spindle motor 7 by way of the sliding gearset transmission stage of the cylindrical gears 9 and 12, to the intermediate shaft 15 through the hollow shaft 11 in the second position by way of the shifting transmission stage of the meshing cylindrical gears 14 and 17 shifted to second drive gear, and finally to the spindle drive shaft of the spindle 6 through the intermediate shaft 15 by way of the angular transmission stage of the bevel gears 18 and 20.

As the spindle 6 with the spindle drive shaft 19, the intermediate shaft 15 as well as the hollow shaft 11 are supported on the shifting transmission shaft 10 in the pivot head 3, these components co-rotate with the pivot head 3 during pivoting the pivot head 3 and do not change their positions relative to each other. That is, in particular, the relative positions of the spindle 6 with the spindle drive shaft 19, the intermediate shaft 15 as well as the hollow shaft 11 on the shifting transmission shaft 10 and of all gears located thereon are identical to each other in FIGS. 4A and 4B. Only the relative position of the drive shaft 8 of the spindle motor 7 and of the cylindrical gear 9 located on the drive shaft 8 in relation to the remaining elements of the drive transmission changes between FIG. 4A and FIG. 4B, if the drive shaft 8 of the spindle motor 7 and the cylindrical gear 9 located on the drive shaft 8 rotate about the pivot axis B by 180 degrees relative to and about the hollow shaft 11 and the cylindrical gear 12.

Figure 5A:
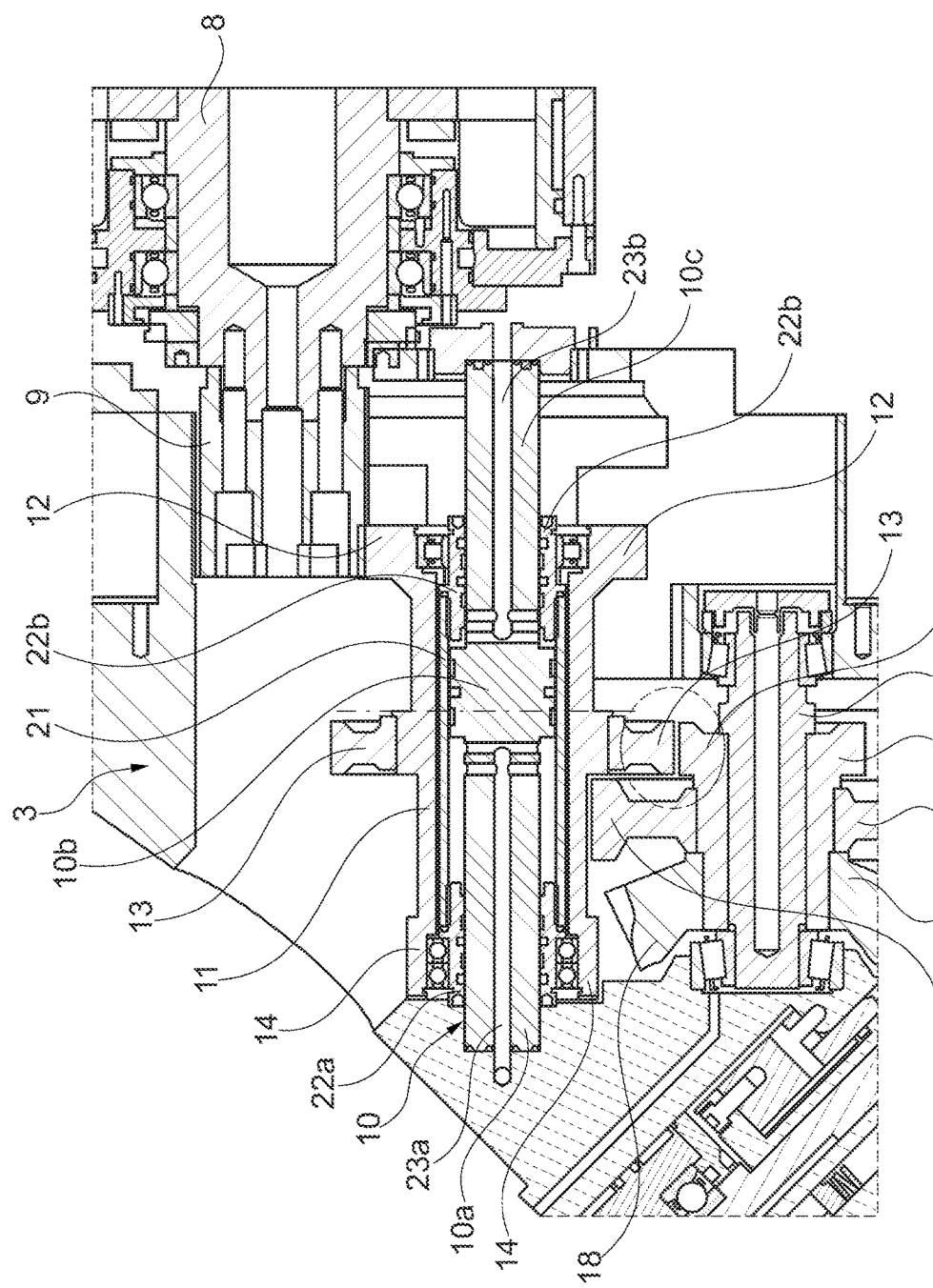
Figure 5B:
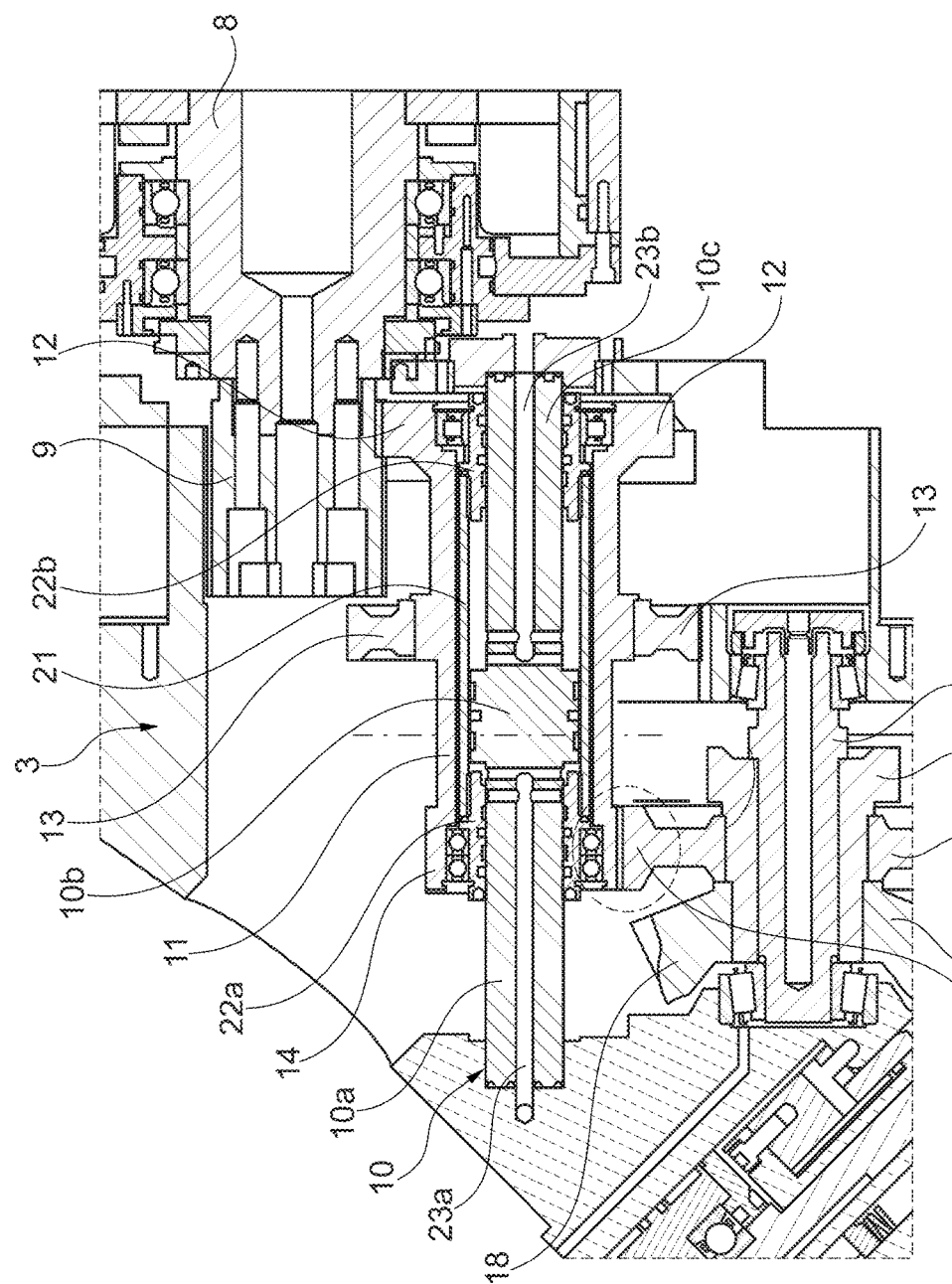

As an example, FIG. 5A shows a cross-sectional view of a shiftable transmission stage according to an embodiment of the disclosure in a first drive gear, and FIG. 5B exemplarily shows a cross-sectional view of a shiftable transmission stage according to an embodiment of the disclosure in a second drive gear.

Particularly, FIGS. 5A and 5B show a detail of the shiftable assembly with the shifting transmission shaft 10 and the hollow shaft 11 in a cross-sectional view. Furthermore, FIGS. 5A and 5B show details of the sliding gearset transmission stage (cylindrical gear 9 on the drive shaft 8 of the spindle motor and cylindrical gear 12 on the hollow shaft 11) and the shiftable transmission stage (cylindrical gears 13 and 14 on the hollow shaft 11 and cylindrical gears 16 and 17 on the intermediate shaft 15 corresponding thereto) as well as the bevel gear 18 of the angular transmission stage.

In FIG. 5A, the hollow shaft 11 is in the first position, so that the first drive gear is shifted or rather engaged. Accordingly, the cylindrical gears 13 and 16 are engaged, and the cylindrical gears 14 and 17 rotate freely. In FIG. 5B, the hollow shaft 11 is in the second position, so that the second drive gear is shifted or rather engaged. Accordingly, the cylindrical gears 14 and 17 are engaged, and the cylindrical gears 13 and 16 rotate freely.

As an example, the shifting transmission shaft 10 has a first axis section 10a, a second axis section 10c, and a piston section 10b arranged between the first axis section 10a and the second axis section 10c, wherein the piston section 10b has a diameter greater than the first axis section 10a and the second axis section 10c. The piston section 10c is movably, in particular sealingly movably, supported within a cylinder jacket 21 of the shiftable transmission stage.

A first sealing head 22a is attached, e.g., screwed or pressed in, at a first end of the cylinder jacket 21, and the first sealing head 22a is movably sealingly supported on the first axis section 10a of the shifting transmission shaft 10, and a second sealing head 22b is attached, e.g., screwed or pressed in, at a second end of the cylinder jacket 21, and the second sealing head 22b is movably sealingly supported on the second axis section 10c of the shifting transmission shaft 10. Thus, the assembly of the cylinder jacket 21 and the sealing heads 22a and 22b as a unit located on the shifting transmission shaft 10 can axially be shifted, wherein the lateral surfaces between the sealing heads 22a and 22b and the axis sections 10a and 10c are sealed or rather the lateral sides between the piston section 10b and the cylinder jacket 21 are sealed.

The first axis section 10a comprises an axially extending first channel 23a and first piston-sided channel openings 24a, and the second axis section 10c comprises an axially extending second channel 23b and second piston-sided channel openings 24b. The first channel openings 24a of the first axis section 10a connect the first channel 23a on piston side with a clearance 25a between the cylinder jacket 21, the piston section 10b, the first axis section 10a, and the first sealing head 22a, and the second channel openings 24a of the second axis section 10c connect the second channel 23b with a clearance 25b between the cylinder jacket 21, the piston section 10b, the second axis section 10c, and the second sealing head 22b.

Figure 6:
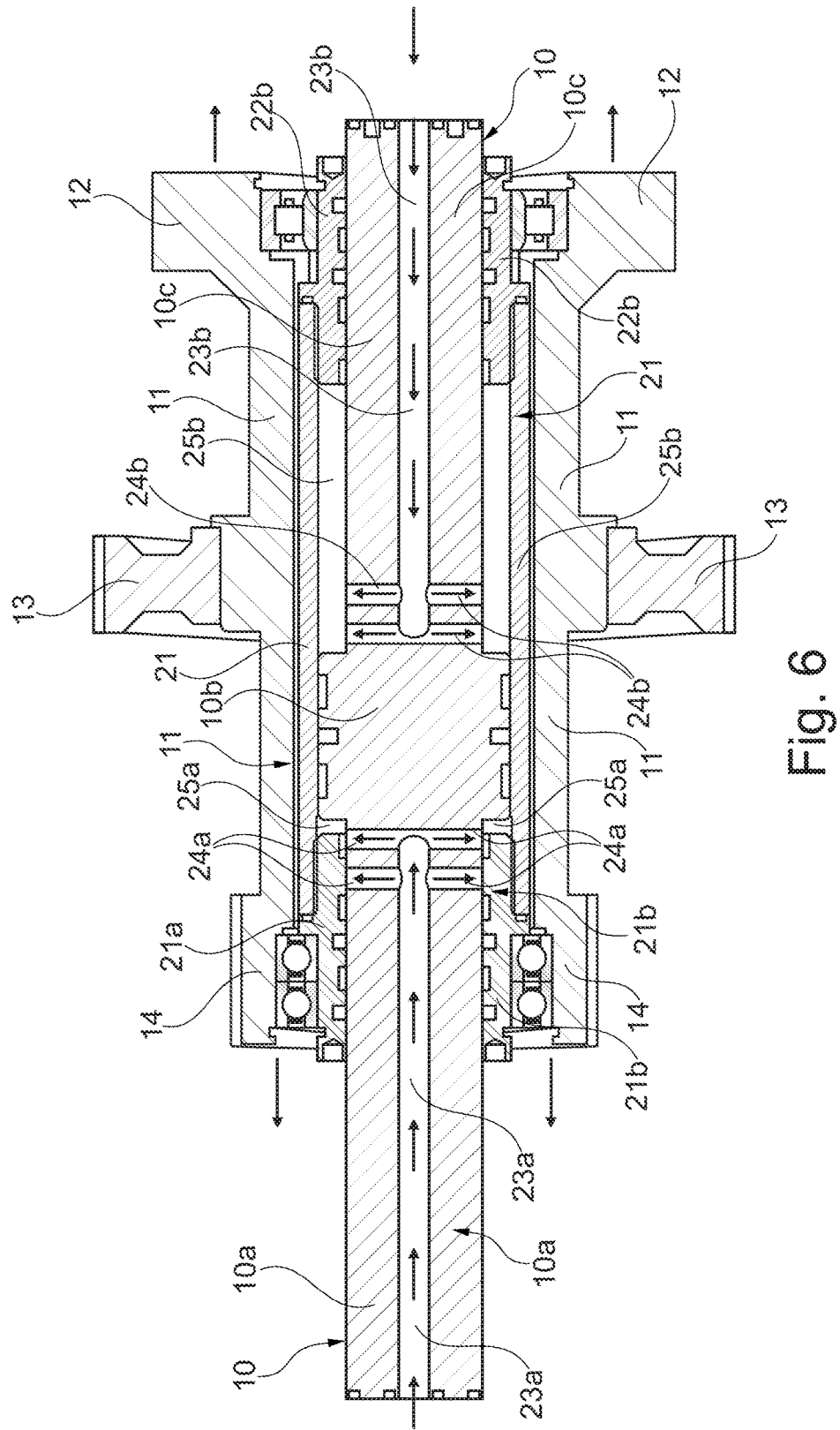

As an example, FIG. 6 shows a cross-sectional view of a detail of the shiftable transmission stage of FIGS. 5A and 5B and shows, in greater detail, the arrangement of the assembly comprising the cylinder jacket 21, the shifting transmission shaft 10 with the piston section 10b and the axis sections 10a and 10c comprising the channels 23a and 23b and the channel openings 24a and 24b.

The hollow shaft 11 is rotatably and fixedly supported on the first sealing head 22a and on the second sealing head 22b (for example with two ball bearings at the first sealing head 22 and a roller bearing at the second sealing head 22b). Thus, the hollow shaft 11 located on the sealing heads is supported rotatably about the sealing heads 22a and 22b and about the cylinder jacket 21, and is furthermore axially movably supported on the shifting transmission shaft 10 together with the sealing heads 22a and 22b located on the shifting transmission shaft 10 and with the cylinder jacket 21 located on the piston section 10b of the shifting transmission shaft 10 as an unit. The sealing heads 22a and 22b thus serve, for example, as pneumatic or rather hydraulic sealing elements of the cylinder jacket 21 as well as guidance and bearing seat for the hollow shaft 11.

The shiftable transmission stage according to FIGS. 5A, 5B, and 6 is configured to be shifted between the first and the second channel 23a and 23b by way of hydraulically and/or pneumatically generated pressure differences. Particularly, the shiftable transmission stage in FIG. 5A is in the first position in which, for the first drive gear, the cylindrical gears 13 and 16 mesh if the hollow shaft 11 is in the first position. In FIG. 5B (and FIG. 6) the shiftable transmission stage is in the second position in which, for the second drive gear, the cylindrical gears 14 and 17 mesh if the hollow shaft 11 is in the second position.

In order to be shifted from the position according to FIG. 5A (first position, first drive gear) to the position according to FIG. 5B (second position, second drive gear), pneumatic and/or hydraulic pressure can be applied in the second axial channel 23b through a side of the shifting transmission shaft 10 averted to the piston section 10b, which acts to the clearance 25b through the channel openings 24b and is shifted to the left in FIG. 5B due to the applied pressure, until the piston section 10b abuts the first sealing head 22b and the hollow shaft 11 has reached the second position according to FIG. 5B or rather FIG. 6.

In order to be shifted from the position according to FIG. 5B (second position, second drive gear) to the position according to FIG. 5A (first position, first drive gear), a pneumatic and/or hydraulic pressure can be applied in the first axial channel 23a through a side of the shifting transmission shaft 10 averted to the piston section 10b, which acts to the clearance 25a through the channel openings 24a and is shifted to the right in FIG. 5A due to the applied pressure, until the piston section 10b abuts the second sealing head 22a and the hollow shaft 11 has reached the first position according to FIG. 5A.

As above, mainly a preferred configuration of the spindle drive and the spindle drive transmission has been mentioned. In the following, an exemplary and preferred configuration of the rotational axis drive for pivoting the rotational axis B shall be described. Furthermore, the exemplary configuration according to FIG. 1 is here referred to.

As shown in FIG. 1, as an example, the head carrier 2 has a rotational axis motor 33 in the head carrier housing 4. The pivot head 3 has a pivot axis gear 26 which is arranged at the transition section to the head carrier 2 and is arranged coaxially to the pivot axis B. A rotatably supported shaft 29 of a transmission unit of the head carrier 2 comprises a gear 27 engaged with the pivot axis gear 26. The shaft 29 is driven by another gear 28 located on the shaft 29, and thus the pivoting of the pivot head 3 about the rotational axis B relative the head carrier 2 is driven by way of the engagement of the gear 27 with the pivot axis gear 26 of the pivot head 3. For driving the shaft 29, the gear 28 is connected, here for example indirectly through a toothed belt 30, with a gear 31 located on a drive shaft 32 of the rotational axis motor 33. The drive shaft 32 of the rotational axis motor 33 and the shaft 29 are, for example, oriented parallel to each other and parallel to the pivot axis B or rather parallel to the drive axis (drive shaft 8) of the spindle motor 7.

As shown in FIG. 1, an advantageous exemplary configuration results, if the rotational axis motor 33 is arranged on the side of the transmission unit, averted to the pivot axis B, with the shaft 29 and the gears 27 and 28, as it is then well accessible from the bottom if maintenance or service is needed.

Moreover, within the head carrier housing, this results in space for a clearance close to the pivot axis B in which supply lines to the pivot head 2, such as power supplies, pneumatic supplies and/or hydraulic supplies as well as supplies for a cooling liquid, can be provided. As an example, a preferably flexible supply pipe 34 extending to the pivot body 3 can be guided within the head carrier housing 4.

According to FIG. 1, preferably the rotational axis motor 33 and the spindle motor 7 are arranged at opposite sides of the pivot axis B relative to each other, so that sufficient space for the supply pipe 34 can be provided in the central space of the head carrier housing 4 and the supply pipe 34 can be guided to the pivot head 3 close to the rotational axis B.

Figure 7A:
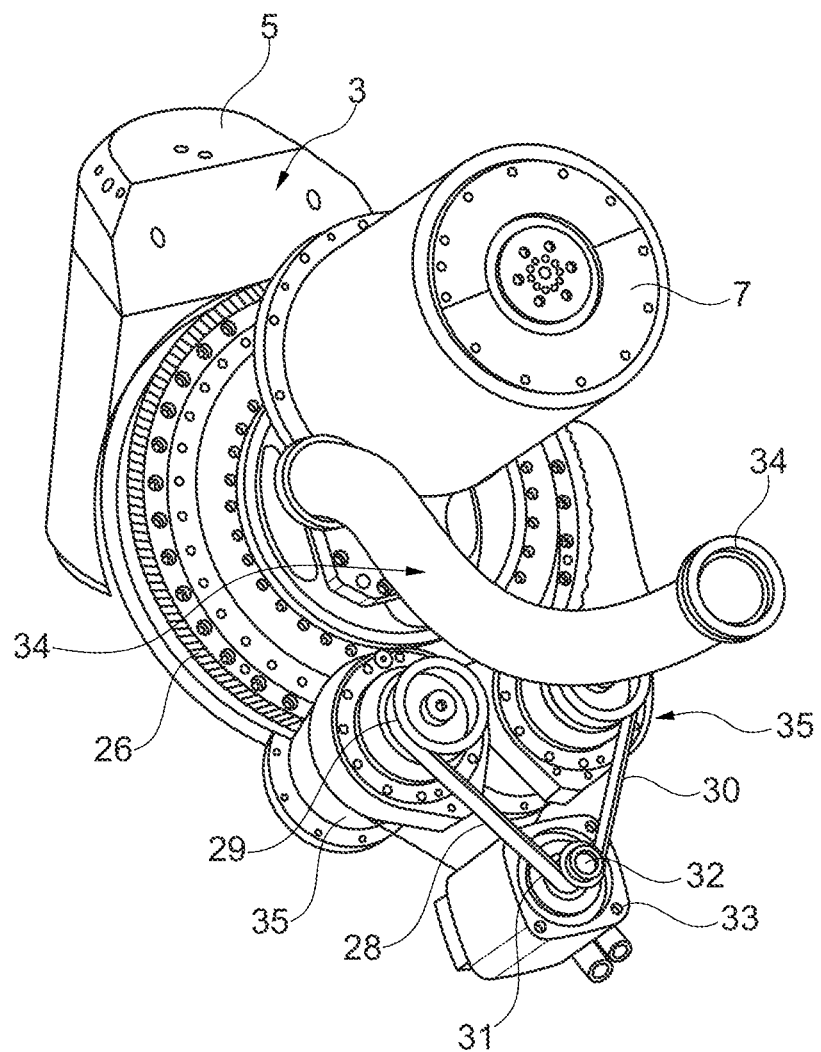
Figure 7B:
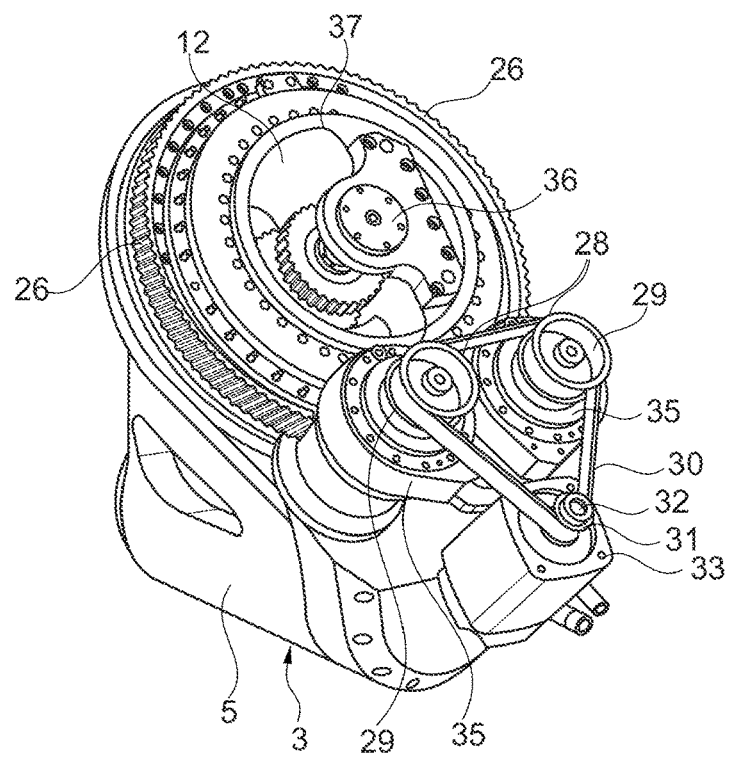
Figure 7C:
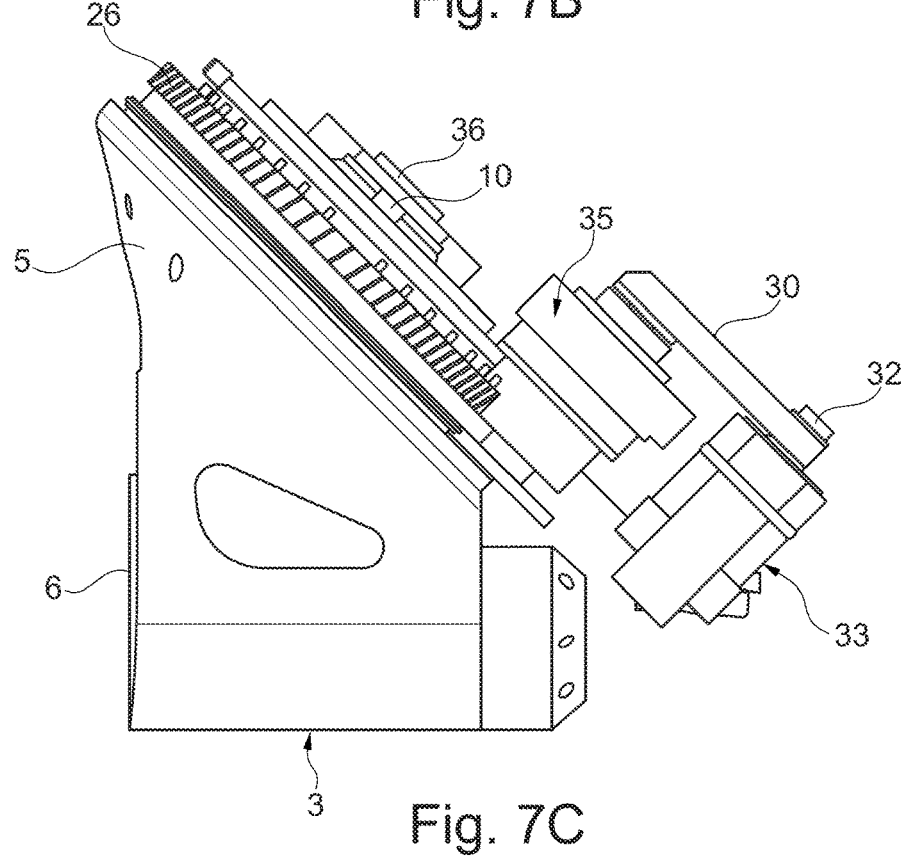

FIG. 7A shows, as an example, a perspective view of an arrangement of drive motors of a head carrier according to a further embodiment of the disclosure, FIG. 7B exemplarily shows a perspective view of a rotational axis drive of a head carrier according to an embodiment of the disclosure (corresponding to FIG. 7A without a spindle motor 7 and without a supply line 34), and FIG. 7C shows, as an example, a side view of the rotational axis drive according to FIG. 7B.

The pivot head 3 comprises the pivot axis gear 26 analogue to FIG. 1 at the front of the pivot head 3 with which the pivot head 3 can rotatably be held on the head carrier. In this embodiment, as an example, the head carrier has two transmission units 35 engaged with the pivot axis gear 26 for transmitting the rotational motion of the drive shaft 32 of the drive axis motor 33 to the pivot axis gear 26, wherein the two transmission units 35 are driven by the common toothed belt 30. In embodiments of the disclosure, the transmission units can be configured, e.g., as mutually strained planetary gears, in particular e.g., with a cooling jacket enclosing the planetary gear.

The supply line or rather the supply pipe 34 extends to the pivot head 3 between the transmission units 35 and the spindle motor 7. The rotational axis motor 33 is arranged on the side of the transmission units 35 averted to the rotational axis B or rather the spindle motor 7.

Each of the two transmission units 35 has a respective main axis (shaft) 29 arranged parallel to the drive shaft 32 of the rotational axis motor 33, wherein the two main axes 29 of the transmission units 35 and the drive shaft 32 of the rotational axis motor 33 are arranged substantially equally spaced to each other, such that the toothed belt 30, engaged with gears 28 of the two transmission units 35 and a gear 31 located on the drive shaft 32 of the rotational axis motor 33, substantially takes a form corresponding to an equilateral triangle (see in particular FIG. 7B).

The rotational axis motor 33 is arranged on the side of the two transmission units 35 averted to the pivot axis B and is arranged easily accessible from below for maintenance and service. The rotational axis motor 33 and the spindle motor 7 are arranged on opposite sides of the pivot axis B relative to each other.

The drive shaft 32 of the rotational axis motor 33 is arranged parallel to the pivot axis B or rather to the axis (drive shaft 8) of the spindle motor 7, and the drive shaft 32 of the rotational axis motor 33 and the drive shaft 8 of the spindle motor 7 span a common plane together with the pivot axis B, wherein the pivot axis B is arranged between the two drive shafts 8 and 32 (see in particular FIG. 7C, drive shaft 8 not shown).

Furthermore, in FIG. 7B, a bearing element 36 attached to the pivot head 3 and a semi-circular opening 37 are shown. Here, the bearing element 36 can serve for holding a head carrier-sided end of the shifting transmission shaft 10 on the end side or rather bearing non-rotatably. The opening 37 allows the, for example overhung, drive shaft 8 of the spindle motor 7 to protrude into the pivot head 3 with the cylindrical gear 9 to engage the cylindrical gear 9 with the cylindrical gear 12.

Figure 8A:
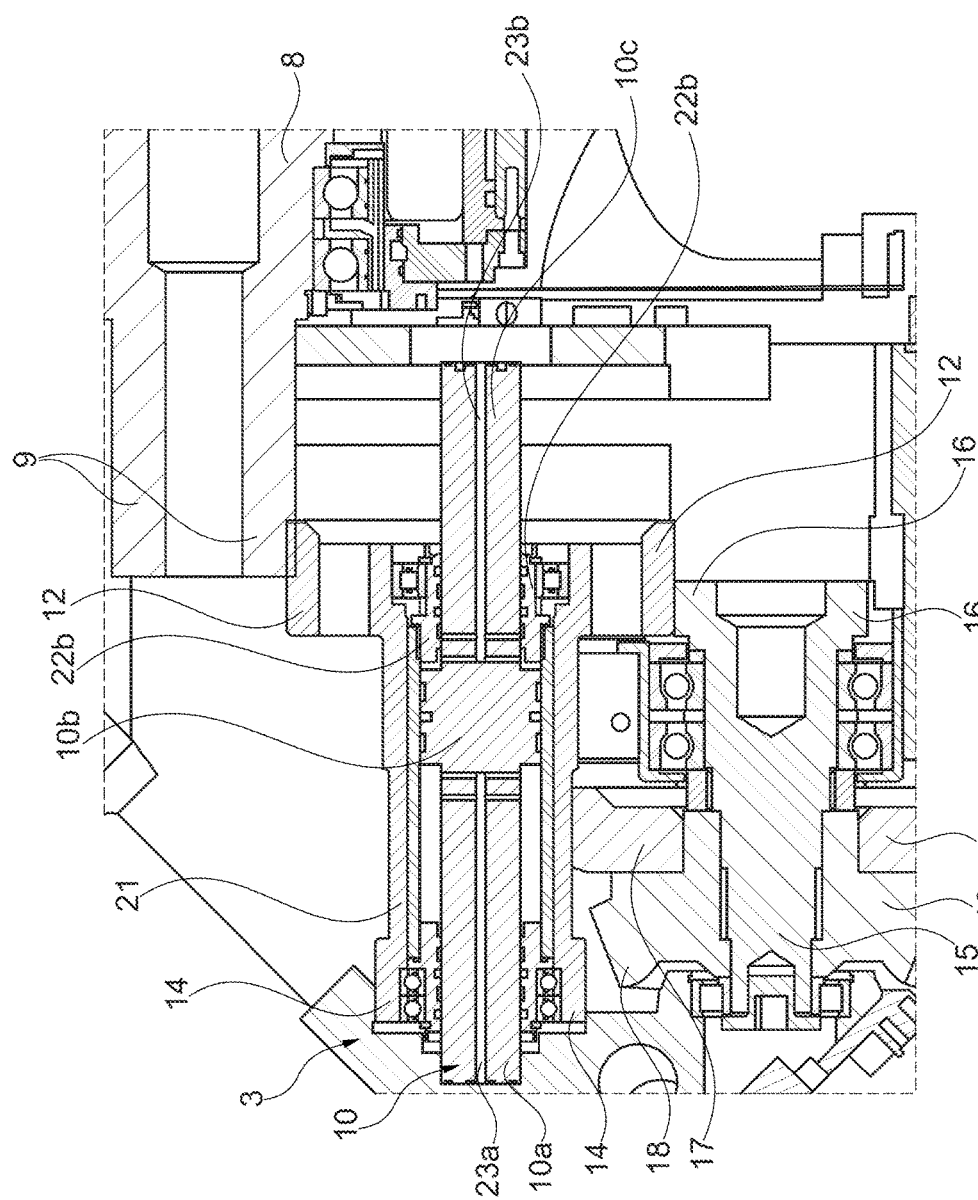
Figure 8B:
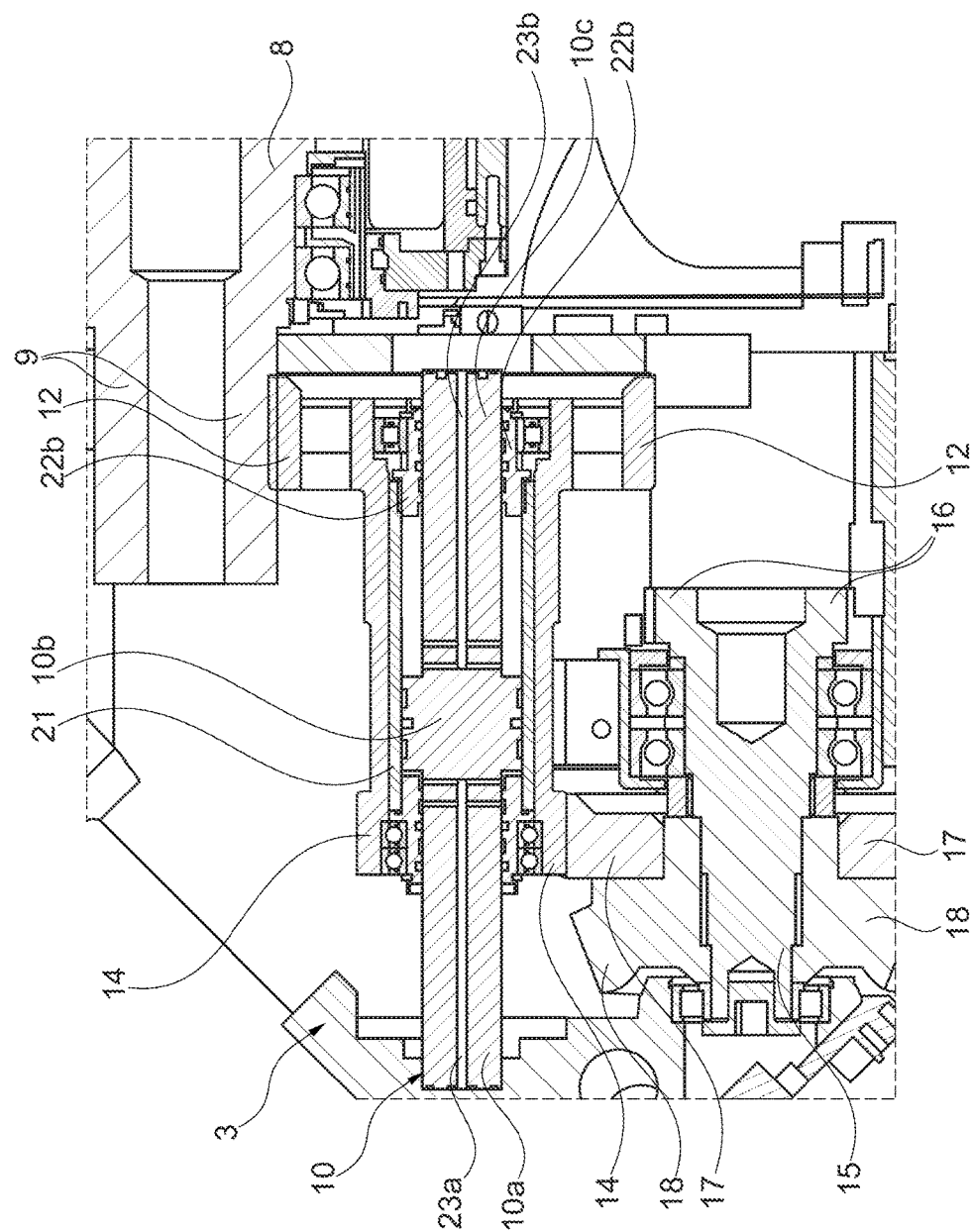

According to another embodiment of the disclosure, FIG. 8A shows, as an example, a cross-sectional view of a shiftable transmission stage in a first drive gear, and FIG. 8B shows, as an example, a cross-sectional view of a shiftable transmission stage in a second drive gear according to a further embodiment of the disclosure.

In contrast to the embodiment according to FIGS. 5A and 5B, in the embodiment according to FIGS. 8A and 8B only two cylindrical gears 12 and 14 are arranged on the hollow shaft 11 instead of three cylindrical gears, wherein the cylindrical gear 12 in the first transmission stage or rather if the first transmission stage is shifted, meshes the cylindrical gear 9 of the drive shaft 8 at one side and meshes the cylindrical gear 16 on the intermediate shaft 15 at the other side.

Particularly, FIGS. 8A and 8B show details of the shiftable assembly with the shifting transmission shaft 10 and the hollow shaft 11 in a cross-sectional view. Furthermore, FIGS. 8A and 8B show details of the sliding gearset transmission stage (cylindrical gear 9 on the drive shaft 8 of the spindle motor and cylindrical gear 12 on the hollow shaft 11) and the shiftable transmission stage (cylindrical gears 12 and 14 on the hollow shaft 11 and cylindrical gears 16 and 17 corresponding thereto on the intermediate shaft 15) as well as the bevel gear 18 of the angular transmission stage.

In FIG. 8A, the hollow shaft 11 is in the first position so that the first drive gear is shifted or rather engaged. Accordingly, the cylindrical gears 12 and 16 are engaged, and the cylindrical gears 14 and 17 rotate freely. In FIG. 8B, the hollow shaft 11 is in the second position, so that the second drive gear is shifted or rather engaged. Accordingly, the cylindrical gears 14 and 17 are engaged, and the cylindrical gear 16 rotates freely, wherein the cylindrical gear 12 is engaged with the cylindrical gear 9 in both transmission stages respectively, but at positions shifted to each other (sliding seat).

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A machining unit for a machine tool, comprising:
a head carrier attachable to the machine tool,
a pivot head which is held on the head carrier in such a way that the pivot head is pivotable about a pivot axis,
a working spindle which is arranged on the pivot head and has a spindle axis tilted in relation to the pivot axis,
a spindle motor which is arranged in the head carrier and comprises a drive shaft arranged parallel to the pivot axis, and
a drive transmission for transmitting a rotational motion of the drive shaft of the spindle motor to a drive shaft of the working spindle,
wherein the drive transmission comprises a shiftable transmission stage,
wherein the pivot head comprises a shifting transmission shaft oriented coaxially to the pivot axis of the pivot head, and
wherein the shiftable transmission stage comprises a hollow shaft movably supported on the shifting transmission shaft of the pivot head.

2. The machining unit according to claim 1, wherein the shiftable transmission stage is configured to shift the drive transmission between a first drive gear and a second drive gear by shifting the movably supported hollow shaft on the shifting transmission shaft parallel to the pivot axis between a first position and a second position.

3. The machining unit according to claim 2, wherein the first drive gear is engaged if the movably supported hollow shaft is in the first position, and the second drive gear is engaged if the movably supported hollow shaft is in the second position.

4. The machining unit according to claim 2, wherein:
the shifting transmission shaft comprises a first axis section, a second axis section, and a piston section arranged between the first axis section and the second axis section,
wherein the piston section has a diameter greater than the first axis section and the second axis section, and
wherein the shiftable transmission stage comprises a cylinder jacket which is arranged in the hollow shaft and in which the piston section is movably sealingly supported.

5. The machining unit according to claim 4, wherein:
a first sealing head is attached at a first end of the cylinder jacket and is movably sealingly supported at the first axis section of the shifting transmission shaft, and
a second sealing head is attached at a second end of the cylinder jacket and is movably sealingly supported at the second axis section of the shifting transmission shaft.

6. The machining unit according to claim 5, wherein the hollow shaft is rotatably supported on the first sealing head and on the second sealing head.

7. The machining unit according to claim 5, wherein the first axis section comprises an axially extending first channel and the second axis section comprises an axially extending second channel, and
wherein first channel openings of the first axis section connect the first channel with a clearance between the cylinder jacket, the piston section, the first axis section, and the first sealing head, and second channel openings of the second axis section connect the second channel with a clearance between the cylinder jacket, the piston section, the second axis section, and the second sealing head.

8. The machining unit according to claim 7, wherein the shiftable transmission stage is configured to be shifted between the first and the second channel by way of hydraulically and/or pneumatically generated pressure differences.

9. The machining unit according to claim 2, wherein the shiftable transmission stage comprises a first cylindrical gear pair for a first transmission gear and a second cylindrical gear pair for a second transmission gear, and wherein the first cylindrical gear pair mesh if the movably supported hollow shaft is in the first position, and the second cylindrical gear pair mesh if the movably supported hollow shaft is in the second position.

10. The machining unit according to claim 1, wherein the drive transmission comprises a sliding gearset transmission stage with a sliding gearset comprising two cylindrical gears, wherein a first cylindrical gear of the sliding gearset is non-rotatably arranged on the drive shaft of the spindle motor and a second cylindrical gear of the sliding gearset engaging the first cylindrical gear is non-rotatably arranged on the movably supported hollow shaft.

11. The machining unit according to claim 1, wherein the shiftable transmission stage comprises a first cylindrical gear pair for a first transmission gear and a second cylindrical gear pair for a second transmission gear.

12. The machining unit according to claim 11, wherein the first cylindrical gear pair comprises a third cylindrical gear non-rotatably arranged on the movably supported hollow shaft and the second cylindrical gear pair comprises a fourth cylindrical gear non-rotatably arranged on the movably supported hollow shaft.

13. The machining unit according to claim 11, wherein the first cylindrical gear pair comprises a second cylindrical gear and the second cylindrical gear pair comprises a fourth cylindrical gear non-rotatably supported on the movably supported hollow shaft.

14. The machining unit according to claim 1, wherein the pivot head comprises an intermediate shaft oriented parallel to the pivot axis of the pivot head.

15. The machining unit according to claim 14, wherein the drive transmission comprises a bevel gear transmission stage, and wherein a first bevel gear of the bevel gear transmission stage is non-rotatably arranged on the intermediate shaft.

16. The machining unit according to claim 15, wherein a second bevel gear of the bevel gear transmission stage for driving the working spindle is non-rotatably arranged on the drive shaft of the working spindle.

17. The machining unit according to claim 14 wherein the shiftable transmission stage comprises a first cylindrical gear pair for a first transmission gear and a second cylindrical gear pair for a second transmission gear, and wherein the first cylindrical gear pair comprises a fifth cylindrical gear non-rotatably arranged on the intermediate shaft, and a second cylindrical gear pair comprises a sixth cylindrical gear non-rotatably arranged on the intermediate shaft.

18. The machining unit according to claim 1, wherein:
the pivot head comprises a pivot axis gear arranged coaxially to the pivot axis, and
the machining unit further comprises a rotational axis motor arranged on the head carrier and one or more transmission units engaged with the pivot axis gear for transmitting a rotational motion of a drive shaft of the rotational axis motor to the pivot axis gear, wherein the one or more transmission units are driven by a common toothed belt engaged with a gear on the drive shaft of the rotational axis motor.

19. The machining unit according to claim 18, wherein the machining unit comprises two transmission units engaged with the pivot axis gear for transmitting the rotational motion of the drive shaft of the rotational axis motor to the pivot axis gear, wherein the two transmission units are driven by the common toothed belt, and
wherein each of the two transmission units comprises a respective main axis arranged parallel to the drive shaft of the rotational axis motor, wherein the two main axes and the drive shaft of the rotational axis motor are arranged substantially equally spaced to each other such that the toothed belt substantially takes a form corresponding to an equilateral triangle.

20. The machining unit according to claim 18, wherein the rotational axis motor is arranged at the side, averted to the pivot axis, of the one or more transmission units.

21. The machining unit according to claim 18, wherein the rotational axis motor and the spindle motor are arranged relative to each other at opposite sides of the pivot axis.

22. The machining unit according to claim 18, wherein:
the drive shaft of the rotational axis motor is arranged parallel to the pivot axis, and
the drive shaft of the rotational axis motor and the drive shaft of the spindle motor span a common plane with the pivot axis and the pivot axis is arranged between the two drive shafts.

23. The machining unit according to claim 1, wherein the pivot head comprises a head carrier housing and a supply pipe for energy, hydraulic and/or pneumatic supplies extending to the pivot head within the head carrier housing.

24. The machining unit according to claim 23, wherein the supply pipe is arranged between the spindle motor and the rotational axis motor.

25. A machine tool with a machining unit according to claim 1, wherein the machining unit is attached to the machine tool movably in at least one coordinate axis.

* * * * *